(12) United States Patent
Chu et al.

(10) Patent No.: US 10,210,121 B2
(45) Date of Patent: Feb. 19, 2019

(54) SYSTEM FOR SWITCHING BETWEEN A SINGLE NODE PCIE MODE AND A MULTI-NODE PCIE MODE

(71) Applicant: Quanta Computer Inc., Taoyuan (TW)

(72) Inventors: Wei-Yi Chu, Taoyuan (TW); Chia-Feng Cheng, Taoyuan (TW); Kai Chang, Taoyuan (TW); Chih-Yu Chen, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 467 days.

(21) Appl. No.: 15/007,753

(22) Filed: Jan. 27, 2016

(65) Prior Publication Data

US 2017/0212858 A1 Jul. 27, 2017

(51) Int. Cl.
*G06F 13/42* (2006.01)
*G06F 13/40* (2006.01)
*G06F 12/02* (2006.01)
*G06F 13/28* (2006.01)

(52) U.S. Cl.
CPC ...... *G06F 13/4022* (2013.01); *G06F 12/0246* (2013.01); *G06F 13/287* (2013.01); *G06F 13/4282* (2013.01); *G06F 2212/7208* (2013.01)

(58) Field of Classification Search
CPC .......... G06F 13/40; G06F 13/42; G06F 13/28; G06F 12/02; G06F 2212/7208
See application file for complete search history.

(56) References Cited

U.S. PATENT DOCUMENTS

| 7,363,417 | B1* | 4/2008 | Ngai | G06F 13/4022 |
| | | | | 710/305 |
| 7,756,123 | B1* | 7/2010 | Huang | G06F 13/4022 |
| | | | | 370/359 |
| 9,842,075 | B1* | 12/2017 | Davis | G06F 13/385 |
| 2007/0139422 | A1* | 6/2007 | Kong | G09G 5/363 |
| | | | | 345/502 |
| 2009/0138647 | A1* | 5/2009 | Hagita | G06F 13/4022 |
| | | | | 710/316 |
| 2011/0113178 | A1* | 5/2011 | Hosoi | G06F 13/4072 |
| | | | | 710/313 |
| 2012/0198129 | A1* | 8/2012 | Van Aken | G06F 12/0246 |
| | | | | 711/103 |
| 2013/0326286 | A1* | 12/2013 | Nagano | G06F 11/0751 |
| | | | | 714/48 |

(Continued)

*Primary Examiner* — Henry Tsai
*Assistant Examiner* — Christopher A Daley
(74) *Attorney, Agent, or Firm* — Nixon Peabody LLP; Zhou Lu

(57) ABSTRACT

A system for switching between a high performance mode and dual path mode is disclosed. The system includes a first device, a second device, a third device, and a switch configured to receive control signals, and in response causing the switch to selectively couple one or more first lanes of the first device or one or more second lanes of the second device to third lanes of the third device to yield enabled lanes. The system also include a number of the enabled lanes is less than or equal to a number of the third lanes, and the switch is configured to route the enabled lanes associated with the first device to a first portion of the third lanes in an increasing order and to route the enabled lanes associated with the second device to a second portion of the third lanes in a decreasing order.

20 Claims, 7 Drawing Sheets

(56) References Cited

U.S. PATENT DOCUMENTS

| | | | | |
|---|---|---|---|---|
| 2016/0124643 A1* | 5/2016 | Liu | ................... | G06F 12/0868 |
| | | | | 711/130 |
| 2016/0127494 A1* | 5/2016 | Liu | ................... | H04L 67/2842 |
| | | | | 709/212 |
| 2016/0239371 A1* | 8/2016 | Jose | ................... | G06F 11/0793 |
| 2018/0039590 A1* | 2/2018 | Hsu | ..................... | G06F 13/28 |
| 2018/0101453 A1* | 4/2018 | Arroyo | ............... | G06F 13/4068 |

* cited by examiner

SYSTEM FOR SWITCHING BETWEEN A SINGLE NODE PCIE MODE AND A MULTI-NODE PCIE MODE

FIELD OF THE INVENTION

The subject matter herein generally relates to transmission architectures for communicating through peripheral component interconnect express buses to non-volatile memory express solid-state drives. More specifically, the subject matter relates to hardware architecture configured to enable switching between a single node transmission mode and a multi-node transmission mode.

BACKGROUND

Peripheral Component Interconnect Express (PCIe) is a high-speed serial computer expansion bus standard. PCIe improves on older bus standards by including a higher maximum system bus throughput, lower input/output pin counter, a smaller physical footprint, and better performance scaling for bus devices. One of the key differences between PCIe and the older bus standards is PCIe is based on point-to-point topology (i.e., opposed to a shared parallel bus architecture). Each PCIe bus can include a number of different lanes (e.g., x1, x2, x4, x8, x16, x32). A lane is composed of two differential signal pairs (i.e., transmit and receive). Each lane is uses as a full-duplex byte stream and can transmit and receive data packets in one-byte (i.e., eight-bit) format simultaneously in both directions. A PCIe interface can receive a PCIe adapter for connecting an endpoint (e.g., a server, solid-state disk drive, disk bay, network device, etc.). The PCIe adapter can include one or more PCIe switches configured to enable multiple endpoints out of the one endpoint. Thus, a PCIe switch can enable one endpoint to be shared by multiple devices.

Solid-state drives (SSD) are one endpoint device that can connect through the PCIe bus as described above. Non-Volatile Memory Express (NVMe) is a specification (i.e., logical interface) for accessing SSDs attached through a PCIe bus. Since, PCIe is a point-to-point topology (one endpoint connected to one endpoint) typically only one endpoint can access the NVMe SSD. While PCIe switches can enable multiple endpoints access to a single endpoint, there is currently no way to enable multiple endpoints access to a single endpoint simultaneously.

SUMMARY OF THE INVENTION

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are a system, method and a non-transitory computer-readable medium for switching between a single node PCIe transmission mode and a multi-node PCIe transmission mode. The system, method and a non-transitory computer-readable medium include a first computing device interface, a second computing device interface, a third computing device interface, and a switch module configured to receive one or more control signals, and in response to receiving the control signals causing the switch module to selectively couple at least one of one or more first lanes of the first computing device interface or one or more second lanes of the second computing device interface to third lanes of the third computing device interface to yield enabled lanes. The system, method and a non-transitory computer-readable medium also include a number of the enabled lanes is less than or equal to a number of the third lanes, and the switch module is configured to route the enabled lanes associated with the first computing device interface to a first portion of the third lanes in an increasing logical order and to route the enabled lanes associated with the second computing device interface to a second portion of the third lanes in a decreasing logical order.

The system, method and a non-transitory computer-readable medium also include the switch module can be configured to enable the first lanes without enabling any of the second lanes. The system, method and a non-transitory computer-readable medium also include the switch module can be configured to enable the second lanes without enabling any of the first lanes. The system, method and a non-transitory computer-readable medium also include the switch module can be configured to enable an equal number of the first lanes and the second lanes.

The system, method and a non-transitory computer-readable medium also include the each of the first computing device interface, the second computing device interface, and the third computing device interface can be a peripheral component interconnect express (PCIe) interface.

The system, method and a non-transitory computer-readable medium also include the first computing device interface can be coupled to a first node and the second computing interface can be coupled to a second node. The system, method and a non-transitory computer-readable medium also include the third computing device interface can be coupled to one or more non-volatile memory express (NVMe) solid-state drives (SSD).

The system, method and a non-transitory computer-readable medium also include, wherein the switch module includes one or more multiplexers.

The system, method and a non-transitory computer-readable medium also include the number of the first lanes, the number of the second lanes, and the number of the third lanes are equal.

The system, method and a non-transitory computer-readable medium also include the number of the first lanes, the number of the second lanes, and the number of the third lanes are different.

The system, method and a non-transitory computer-readable medium can also include a first node coupled to a switch module by a PCIe bus having a first predefined number of lanes, a second node coupled to the switch module by a second PCIe bus having a second predefined number of lanes, and an NVMe SSD coupled to the switch module by a third PCIe bus having a third predefined number of lanes. The system can also include the switch module being configured to receive one or more control signals, and in response to receiving the control signals causing the switch module to enable or disable one or more of the first predefined lanes and second predefined lanes, the enabled lanes equal the third predefined number of lanes.

BRIEF DESCRIPTION OF THE DRAWINGS

Various embodiments in accordance with the present disclosure will be described with reference to the drawings, in which.

DETAILED DESCRIPTION

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Several definitions that apply throughout this disclosure will now be presented. The term "coupled" is defined as connected, whether directly or indirectly through intervening components, and is not necessarily limited to physical connections. The term "comprising" means "including, but not necessarily limited to"; it specifically indicates open-ended inclusion or membership in a so-described combination, group, series and the like.

Figure 1:
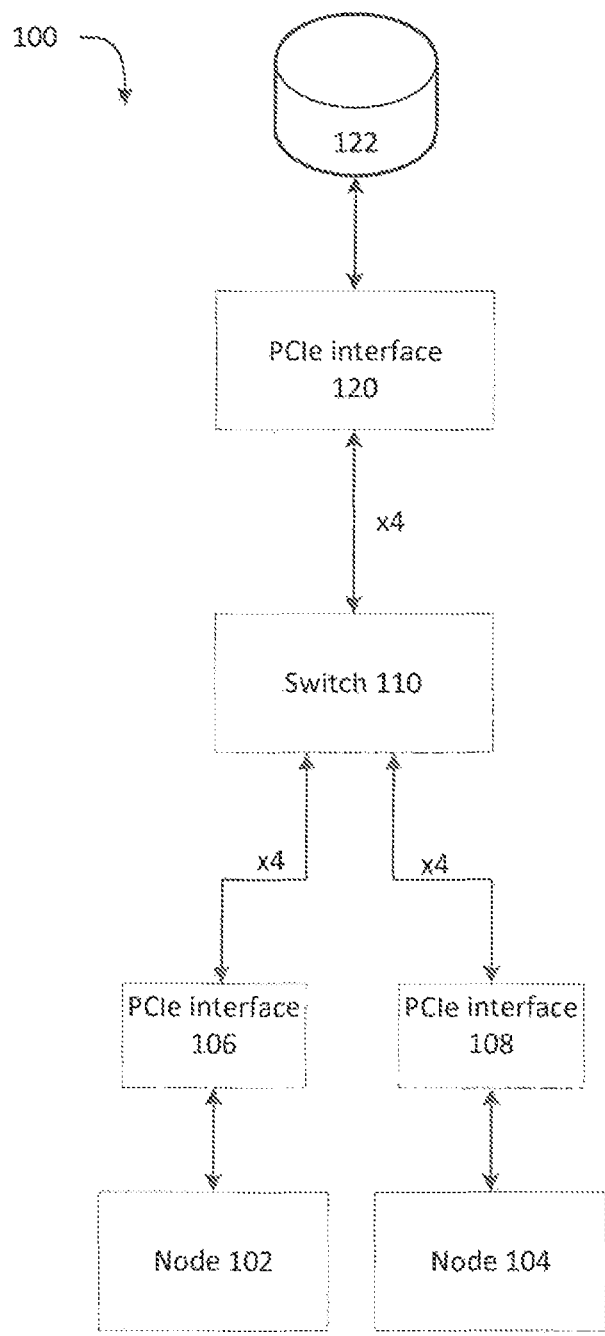
FIG. 1 illustrates an example of a single switch architecture for switching between single node and multi-node transmission modes.

FIG. 1 illustrates an example of a single switch architecture 100 for switching between single node and multi-node transmission modes. In a single node mode, all lanes can utilized by a single node enabling high performance data transmission. In a multi-node mode, the lanes are shared by multiple nodes enabling multi-path data transmission. Single switch architecture 100 includes first node 102 and second node 104. For example, nodes can be servers, clustered servers, multi-servers, or any computing device capable of at least transmitting and receiving data. Nodes 102 and 104 can be connected to a PCIe bus through PCIe interface 106 and 108, respectively. For example, PCIe interface can be configured to receive a network adapter, Ethernet adapter, wireless connectivity adapter, universal serial bus adapter, or any other type of adapter for connecting a node with a PCIe bus. The PCIe interfaces can enable the nodes to communicate with one or more other endpoints (e.g., NVMe SSDs, etc.). In this example embodiment, the PCIe interfaces 106 and 108 can each connect to four lanes (x4) of a PCIe bus. Each of the four lanes can include a transmit and receive serial connection on the PCIe bus. Thus, four lanes can include four transmit paths and four receive paths. In other embodiments, the PCIe buses can include more or less than 4 lanes (e.g., x2, x8, x16, x32, etc.).

The four lanes of PCIe interface 106 and second PCIe interface 108 can be coupled to switch 110. The switch 110 can enable nodes 102 and 104 access to other endpoint devices (e.g., NVMe SSDs, etc.) through PCIe interfaces 106 and 108. In some embodiments, switch 110 can be one or more high speed multiplexers. In some embodiments, switch 110 can be an integrated circuit chip (e.g., on a PCIe interface, on a main board, etc.).

In some embodiments, PCIe interface can 120 include four lanes. Switch 110 can enable four lanes (out of eight lanes) from PCIe interface 106 and PCIe interface 108 to communicate with NVMe SSD 122 through four lanes of PCIe interface 120. Thus, the four lanes of PCIe interface 106 and 108 can transmit and receive data from NVMe SSD 122 through the four lanes of PCIe interface 120 (i.e., four lanes from first node 102, four lanes from second node 104, or two lanes from node 102 and two lanes from node 104). In other embodiments PCIe interface 120 can include more or less than four lanes. In the other embodiments, the total number of enabled lanes from PCIe interface 106 and PCIe interface 108 cannot exceed the number of lanes of PCIe interface 120.

Switch 110 can be configured to receive one or more control signals (e.g., a binary low signal or a binary a high signal) to determine which four lanes (i.e., out of the eight lanes from PCIe interface 106 and 108) are enabled (i.e., can transmit data to and receive data from an endpoint connected to switch 110). For example, when the control signal is low, switch 110 can enable the four lanes of PCIe interface 106 and disable the four lanes of PCIe interface 108. In another example, when the control signal is high, switch 110 can enable the four lanes of PCIe interface 108 and disable the four lanes of PCIe interface 106. In another embodiment, switch 108 can receive two control signals, enabling the first two lanes of PCIe interface 106 and the first two lanes of PCIe interface 108 and disable the last two lanes of PCIe interface 106 and the last two lanes of PCIe interface 108.

Single switch architecture 100 can also include one or more NVMe SSDs 122 configured to connect to switch 110 through PCIe interface 120. PCIe interface 120 can connect to switch 110 through a PCIe bus. In this example embodiment, the PCIe interface 120 can connect to a PCIe bus with four lanes (i.e., x4). Each of the four lanes can include a transmit and receive serial connection on the PCIe bus. Thus, four lanes can include four transmit paths and four receive paths. In other embodiments, the PCIe bus can include more or less than 4 lanes (e.g., x2, x8, x16, x32, etc.).

The present disclosure contemplates that the control signals for switch 110 can be provided in a variety of ways. In some cases, the control signals can be specified manually. For example, via a user setting, via a jumper setting, or other means of providing a persistent setting for the control signals. In other cases, the control signals can be specified automatically and/or dynamically. That is, based on the types of devices being connected. For example, in the example of FIG. 1, the switch 110 or another component in communication with PCI interfaces 106, 108, and 120, can detect the number of lanes associated with each of the PCIe devices attached to these interfaces and automatically configure the switch 110 accordingly. This can also be a dynamic process. That is, if Node 102 is a four lane PCIe device and Node 104 is a two lane PCIe device, the switch 110 can alternate between a four lane and a two lane configuration as each device communicates with NVMe SSDs 122.

Figure 2:
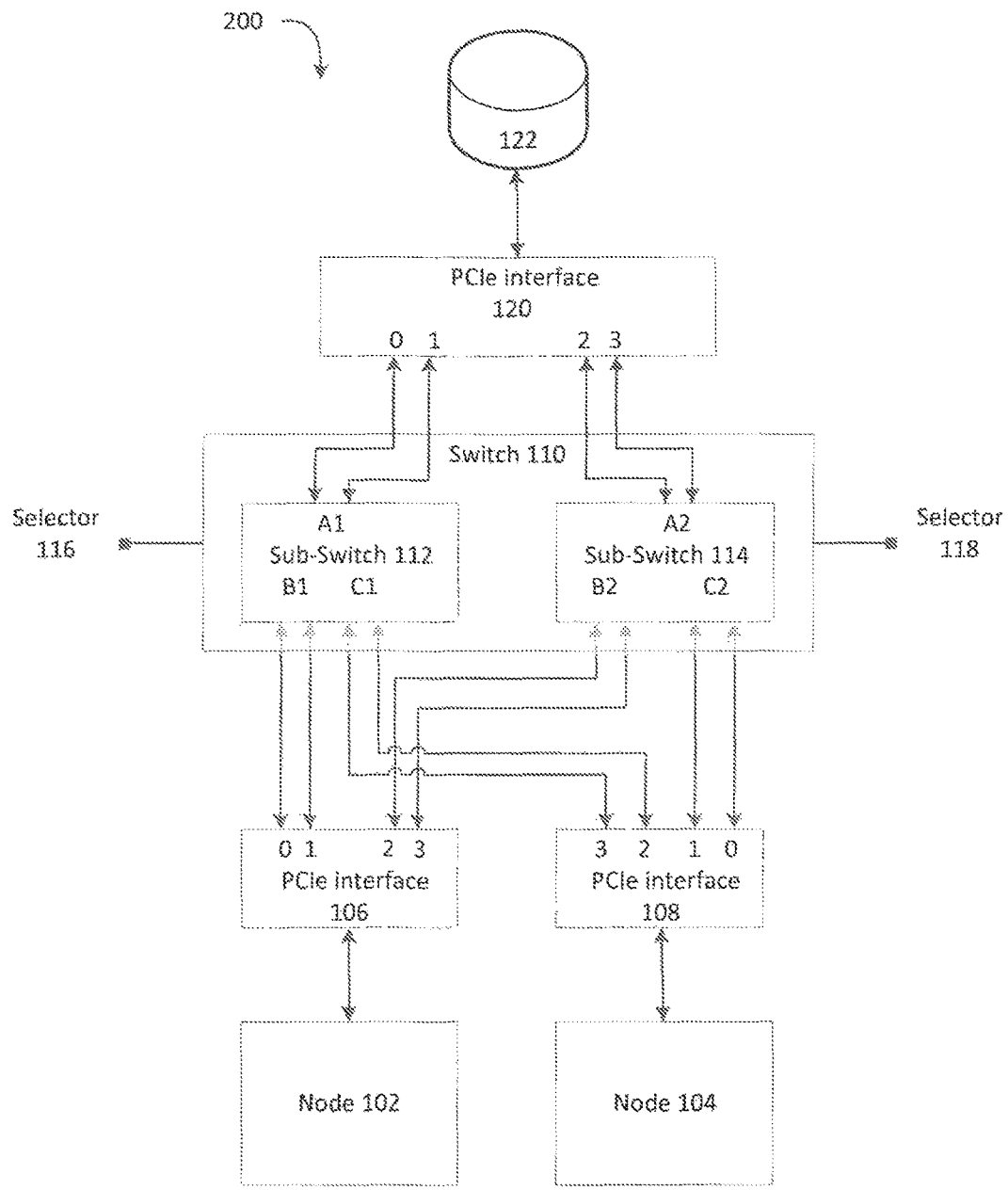
FIG. 2 illustrates an example of a dual switch architecture for switching between single node and multi-node transmission modes.

FIG. 2 illustrates an example of a dual switch architecture 200 for switching between single node and multi-node transmission modes. Dual switch architecture 200 can include switch 110 including first sub-switch 112 and second sub-switch 114. In some embodiments, sub-switches 112 and 114 can be high speed multiplexers. In some embodiments, sub-switch 112 and 114 can be integrated circuit chips (e.g., on a PCIe interface, on a main board, etc.).

Switch 110 is configured to providing different routings of the lanes associated with PCIe interfaces 106 and 108 to the lanes for PCIe interface 120. The routings as described are based on the PCIe specification, maintained by Peripheral Component Interconnect Special Interest Group (PCI-SIG). As to the routing between PCIe interfaces 106 and 120, switch 110 provides a routing of lanes in an increasing logic order. That is, 0→0, 1→1, 2→2, and 3→3, as shown in FIG. 2 and as discussed in greater detail below. In contrast, as to the routing between PCIe interfaces 108 and 120, switch 110 provides a routing of lanes in a decreasing logic order. That is, 3→0, 2→1, 1→2, and 0→3, as shown in FIG. 2 and as discussed in greater detail below.

First sub-switch 112 can be configured to enable a connection with node 102 and node 104 by the first lane and the second lane (i.e., [0:1]) of PCIe interface 106 and the third lane and fourth lane (i.e., [3:2]) of PCIe interface 108, respectively. Second sub-switch 112 can be configured to enable a connection with node 102 and node 104 by the third lane and fourth lane (i.e., [2:3]) of PCIe interface 106 and the first lane and the second lane (i.e., [1:0]) of PCIe interface 108, respectively. First sub-switch 112 can be configured to enable a connection to NVMe SSD 122 through the first lane and the second lane (i.e., [0:1]) of PCIe interface 120. Selector 116 can determine, based on a first control signal, to enable the lanes from PCIe interface 106 or PCIe interface 108 to connect to sub-switch 112. Second sub-switch 114 can be configured enable a connection to NVMe SSD 122 through a third lane and a fourth lane (i.e., [2:3]) of PCIe interface 120. Selector 118 can determine, based on a second control signal, to enable the lanes from PCIe interface 106 or PCIe interface 108 to connect to sub-switch 114.

When selector 116 receives a low control signal, first sub-switch 112 can enable a connection of the first lane and second lane (i.e., [0:1]) of PCIe interface 106 to the first lane and second lane (i.e., [0:1]) of PCIe interface 120. When selector 116 receives a high control signal, first sub-switch 110 can enable a connection of the third lane and fourth lane (i.e., [3:2]) of PCIe interface 108 to the first lane and second lane (i.e., [0:1]) of PCIe interface 120. When selector 118 receives a low control signal, second sub-switch 114 can enable a connection of the third lane and fourth lane (i.e., [2:3]) of PCIe interface 106 to the third lane and fourth lane (i.e., [0:1]) of PCIe interface 120. When selector 118 receives a high control signal, second sub-switch 114 can enable a connection of the first lane and second lane (i.e., [1:0]) from PCIe interface 108 to the third lane and fourth lane (i.e., [2:3]) of PCIe interface 120.

Figure 3A:
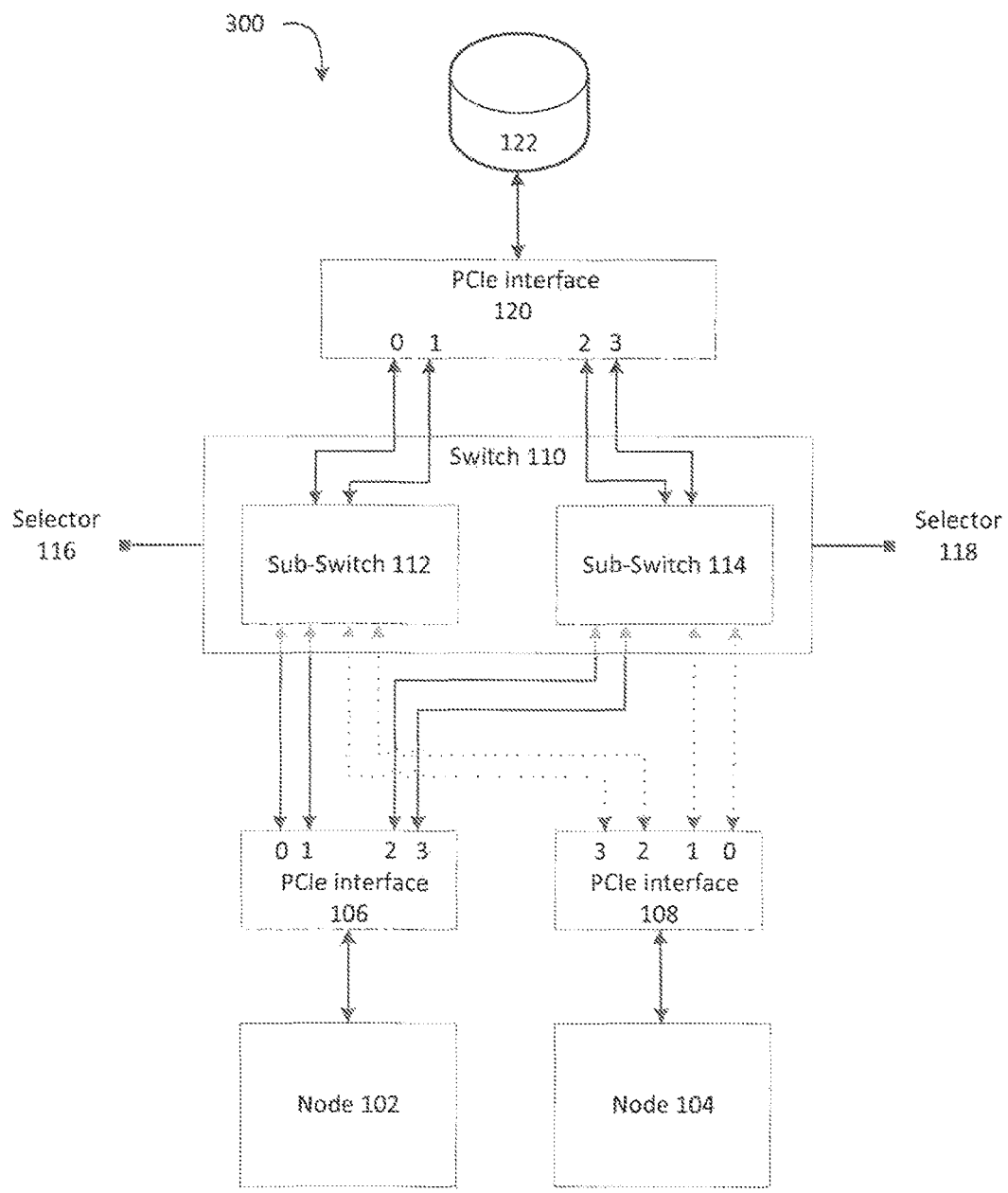
FIG. 3A illustrates an example of a dual switch architecture operating in a single node transmission mode.
Figure 3B:
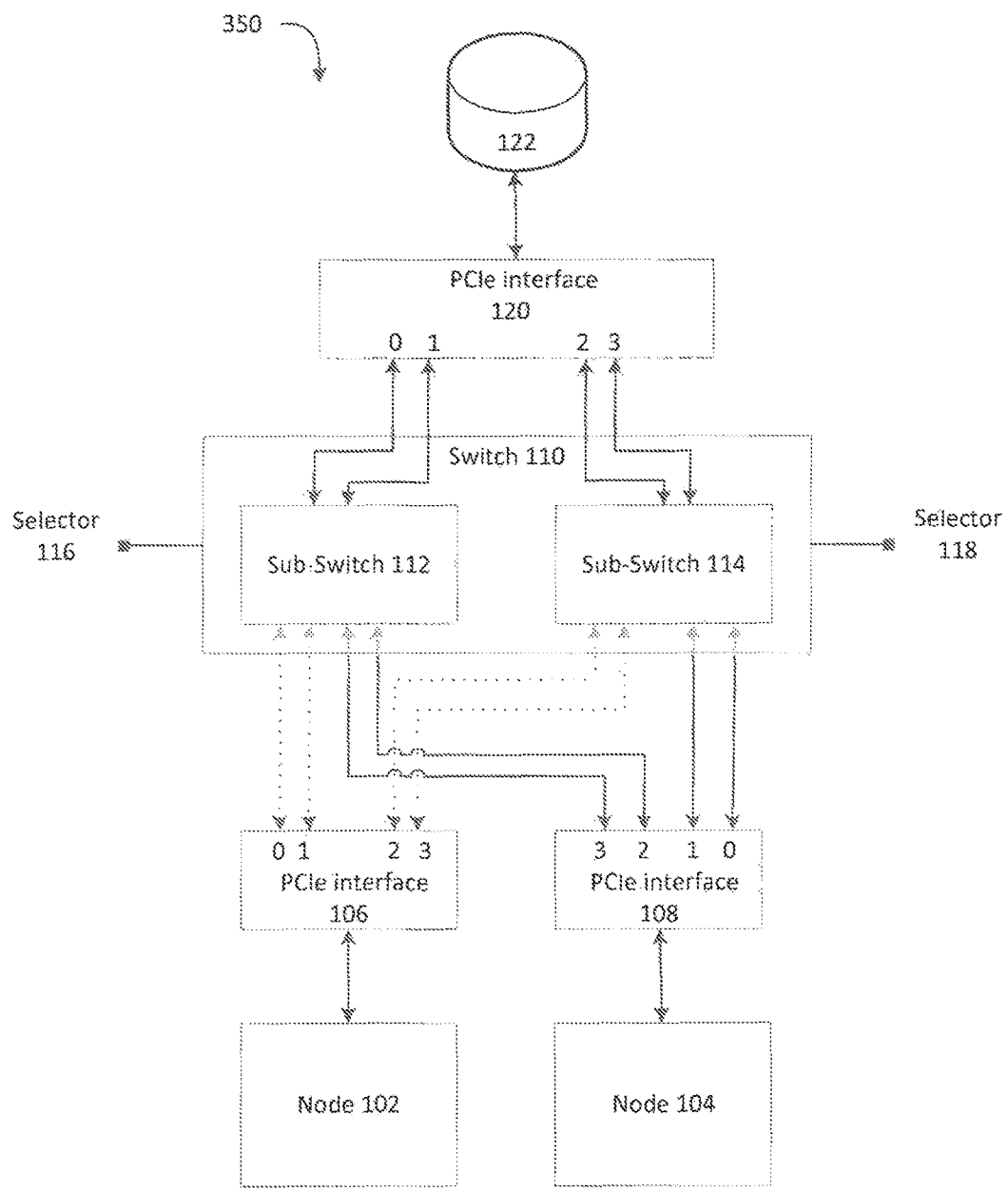
FIG. 3B illustrates an example of a dual switch architecture operating in a single node transmission mode.
Figure 4:
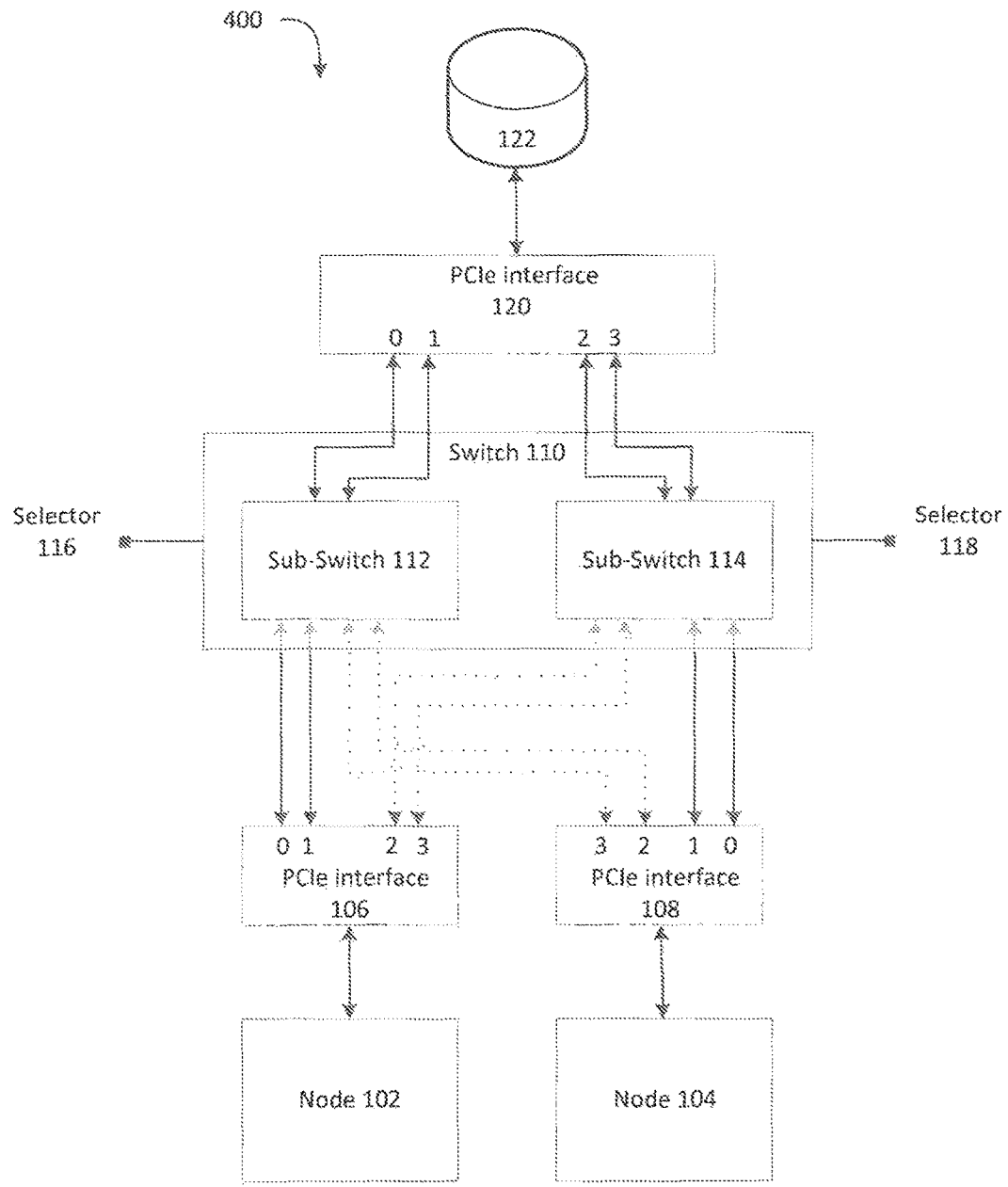
FIG. 4 illustrates an example of a dual switch architecture operating in a dual node transmission mode.

When selector 116 and selector 118 both receive a low control signal, the dual switch architecture 200 can operate in high performance mode for node 102 (as illustrated in FIG. 3A). When selector 116 and selector 118 both receive a high control signal, the dual switch architecture 200 can operate in high performance mode for node 104 (as illustrated in FIG. 3B). When selector 116 receives a low control signal and selector 118 receives a high control signal, the dual switch architecture 200 can operate in dual path mode for node 102 and node 104 (as illustrated in FIG. 4).

While FIG. 2 illustrates an example embodiment of a PCIe bus with four lanes, it should be understood that one of ordinary skill in the art could use a PCIe bus with more or less lanes. For example, a PCIe bus with 2 lanes could be used. In another embodiment, a PCIe bus of 8, 16, or 32 lanes could be used.

FIG. 3A illustrates an example of a dual switch architecture operating in a single node transmission mode 300. Specifically, a high performance mode (1x4) of first node 102 (i.e., one node with four lanes). First sub-switch 112 and second sub-switch 114 can each receive at low control signal at selector 116 and selector 118. In some embodiments, sub-switch 112 and 114 can be high speed multiplexers. In other embodiments, a single switch can be used. In response to receiving the low control signal and as illustrated in FIG. 3A, first sub-switch 112 can enable the first lane and second lane (i.e., [0:1]) of PCIe interface 106. The first lane and second lane of PCIe interface 106 can connect to PCIe interface 120 through the first and the second lane (i.e., [0:1]), respectively. Upon enabling of the first and second lanes, node 102 can transmit data to and receive data from NVMe SSD 122.

In response to receiving the low control signal and as illustrated in FIG. 3A, second sub-switch 114 can enable the third lane and fourth lane (i.e., [2:3]) of PCIe interface 106. The third lane and fourth lane of PCI interface 106 can connect to PCIe interface 120 through the third and the second lane (i.e., [2:3]), respectively. Upon enabling the third and fourth lanes, node 104 can transmit data to and receive data from NVMe SSD 122.

FIG. 3B illustrates an example of a dual switch architecture operating in a single node transmission mode 350. Specifically, a high performance mode (1x4) of second node 104 (i.e., one node with four lanes). First sub-switch 112 and second sub-switch 114 can each receive at high control signal at selector 116 and selector 118. In some embodiments, sub-switch 112 and 114 can be high speed multiplexers. In other embodiments, a single switch can be used. In response to receiving the high control signals and as illustrated in FIG. 3B, first sub-switch 112 can enable the third lane and fourth lane (i.e., [3:2]) of PCIe interface 108. The third lane and fourth lane of PCIe interface 108 can connect to PCIe interface 120 through the first and the second lane (i.e., [0:1]), respectively. Upon enabling of the third lane and fourth lane, node 104 can transmit data to and receive data from NVMe SSD 122.

In response to receiving the high control signals and as illustrated in FIG. 3B, second sub-switch 114 can enable the first lane and second lane (i.e., [1:0]) of PCIe interface 108. The first lane and second lane of PCIe interface 108 can connect to PCIe interface 120 through the third lane and fourth lane (i.e., [2:3]), respectively. Upon enabling of the first lane and second lane node 104 can transmit data to and receive data from NVMe SSD 122.

FIG. 4 illustrates an example of a dual switch architecture operating in a dual path transmission mode 400. Specifically, a dual path mode (2x2) of first node 102 and second node 104 (e.g., twos nodes each with two lanes). First sub-switch 112 can receive a low control signal at selector 116 and second sub-switch 114 can receive a high control signal at selector 118. In some embodiments, sub-switch 112 and 114 can be high speed multiplexers. In other embodiments, a single switch can be used. In response to receiving the low control signal at first sub-switch 112 and also as illustrated in FIG. 4, first sub-switch 112 can enable the first lane and second lane (i.e., [0:1]) of PCIe interface 106. The first lane and second lane of PCIe interface 106 can connect to PCIe interface 120 through the first and the second lane (i.e., [0:1]), respectively. Upon enabling of the first and second lanes, node 102 can transmit data to and receive data from NVMe SSD 122.

In response to receiving the high control signal and as illustrated in FIG. 4, second sub-switch 114 can enable the first lane and second lane (i.e., [1:0]) of PCIe interface 108. The first lane and second lane of PCIe interface 108 can connect to PCIe interface 120 through the third lane and fourth lane (i.e., [2:3]), respectively. Upon enabling of the first lane and second lane node 104 can transmit data to and receive data from NVMe SSD 122.

While FIGS. 3A, 3B, and 4 illustrate exemplary embodiments of a PCIe bus with four lanes, it should be understood that one of ordinary skill in the art could use a PCIe bus with more or less lanes. For example, a PCIe bus with 2 lanes could be used. In another embodiment, a PCIe bus of 8, 16, or 32 lanes could be used.

Further, although the exemplary embodiments identify communications with specific types of PCIe devices, the various embodiments are not limited in this regard. Rather, the present disclosure contemplates that the methods and systems discussed herein are applicable with any type of PCIe device. Moreover, the methods and systems discussed herein are equally applicable to any types of computing device interfaces, including PCIe interfaces, for which management of communications different numbers of lanes, channels, or the like, allows a largest possible number of lanes, channels, or the like to be used to maximize throughput between such computing device interfaces and computing devices coupled thereto.

Figure 5:
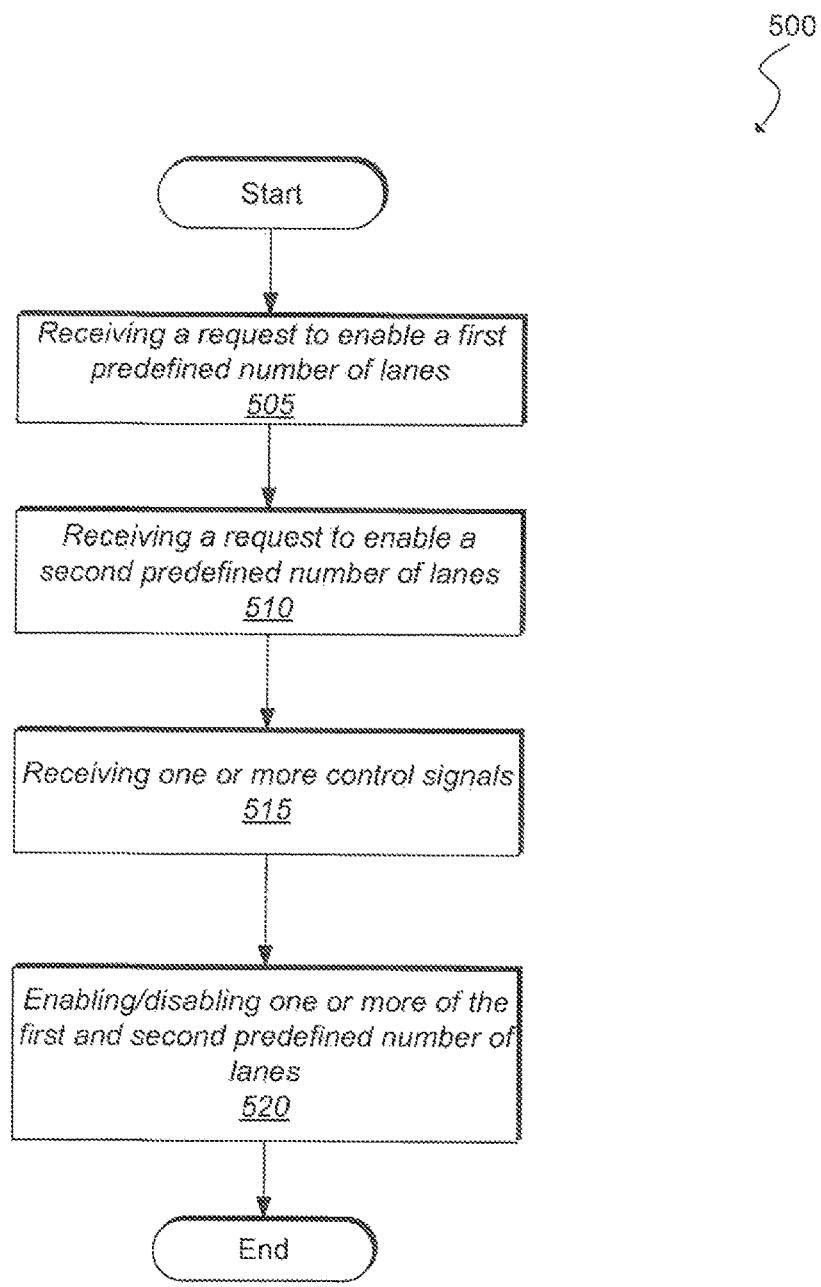
FIG. 5 illustrates an example method of switching between a single node transmission mode and a multi-mode transmission mode.

Now turning to FIG. 5, there is shown a method for managing communications between PCIe devices with different lane configurations in accordance with the present technology. The method illustrated in FIG. 5 is provided by way of example, as there are a variety of ways to carry out the method. Additionally, while the example method is illustrated with a particular order of steps, those of ordinary skill in the art will appreciate that FIG. 5 and the steps illustrated therein can be executed in any order that accomplishes the technical advantages of the present disclosure and can include fewer or more steps than illustrated.

Each step shown in FIG. 5 represents one or more processes, methods or subroutines, carried out in example method. The steps illustrated in FIG. 5 can be implemented in a system illustrated in FIGS. 1 and 2. The flow charts illustrated in FIG. 5 will be described in relation to and make reference to at least nodes 102 and 104; PCIe interfaces 106, 108, 120; switch 110; and NVMe SSD drive 122 as illustrated in FIGS. 1 and 2.

Method 500 can begin at step 505. At step 505, switch module 110 can receive a request to enable a first predefined number of lanes. For example, switch module 110 can receive over a PCIe bus, a request from node 102 (by PCIe interface 106) to enable one or more lanes for access to NVMe SSD drive 122 (by PCIe interface 120). When switch module has received the request, method 500 can process to step 510.

At step 510, switch module 110 can receive a request to enable a second predefined number of lanes. For example, switch module 110 can receive over a PCIe bus, a request from node 104 (by PCIe interface 108) to enable one or more lanes for access to NVMe SSD drive 122 (by PCIe interface 120). When switch module has received the request, method 500 can process to step 515.

At step 515, switch module 110 can receive one or control signals. For example, switch module 110 can receive one control signal that either binary low (i.e., 0) or binary high (i.e., 1). In another example, switch module 110 can receive two control signals that are either binary low (i.e., 0) or binary high (i.e., 1). When two control signals are received, switch module 110 can have four possible binary values (i.e., 00, 01, 10, 11). Thus, the more control signals received, the more possibilities switch module 110 has for enabling and disabling the number of lanes on the connected PCIe buses. When one or more control signals are received, method 500 can proceed to step 520.

At step 520, switch module 110 can enable or disable one or more of the requested number of predefined lanes. For example, when a binary low signal is received, switch module 110 can enable the first predefined number of lanes and disable the second predefined number of lanes. In this example, node 102 can operate in a high performance single node transmission mode. In another example, when a binary high signal is received, switch module 110 can enable the second predefined number of lanes and disable the first predefined number of lanes. In this example, node 104 can operate in a high performance single node transmission mode. In another example, when a binary low signal and a binary high signal is received, switch module 110 can enable and disable an equal number of lanes from the first predefined number of lanes and the second predefined number of lanes. In this example, node 102 and node 104 can operate in a dual path multi-node transmission mode. In any of these examples, the number of enabled lanes cannot exceed a third predefined number of lanes. For example, the number of lanes of PCIe interface 120. When the switch module has enabled and disabled lanes the method 500 can end.

Figure 6A:
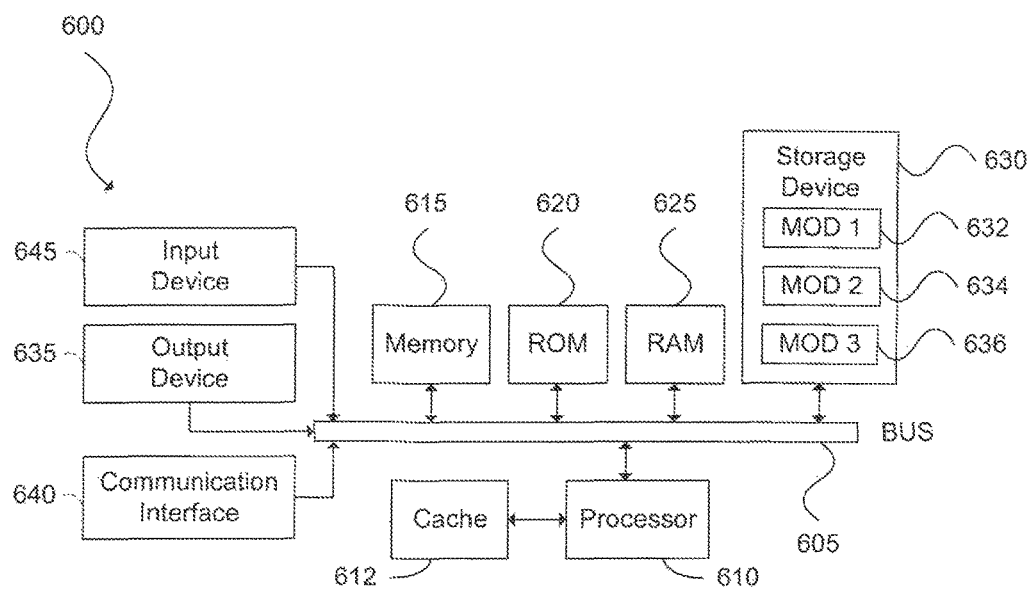
FIG. 6A shows an example system embodiment for implementing various embodiments of the present technology.
Figure 6B:
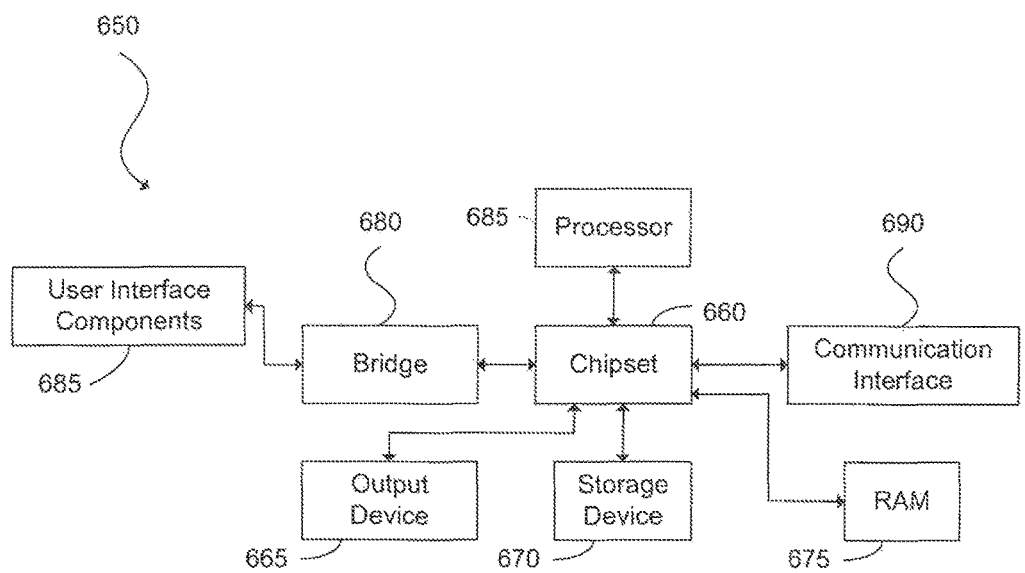
FIG. 6B shows an example system embodiment for implementing various embodiments of the present technology.

Although the foregoing exemplary embodiments illustrate methods performed by specific types of components, the present disclosure contemplates that the methods described above can be implements via other types of devices, such as a computing system or the like. For example, FIG. 6A and FIG. 6B show example possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Example system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 can be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 can essentially be a completely self-contained computing system, containing multiple cores or processors, a bus, memory controller, cache, etc. A multi-core processor can be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here can easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system comprising:
a first computing device interface;
a second computing device interface;
a third computing device interface;
and a switch module configured to receive one or more control signals, and in response to receiving the control signals causing the switch module to selectively couple at least one of one or more first lanes of the first computing device interface or one or more second lanes of the second computing device interface to third lanes of the third computing device interface to yield enabled lanes,
wherein the switch module comprises a first sub-switch configured to couple with the first computing device and a second sub-switch configured to couple with the second computer device, wherein the first sub-switch is configured to receive a first control signal and the second sub-switch is configured to receive a second control signal, the second control signal being distinct from the first control signal, wherein each of the first control signal and the second control signal enables or disables one or more predefined lanes,
wherein a number of the enabled lanes is less than or equal to a number of the third lanes, and
wherein the switch module is configured to route the enabled lanes associated with the first computing device interface to a first portion of the third lanes in an increasing logical order and to route the enabled lanes associated with the second computing device interface to a second portion of the third lanes in a decreasing logical order.

2. The system of claim 1, wherein the switch module is configured to enable the first lanes without enabling any of the second lanes.

3. The system of claim 1, wherein the switch module is configured to enable the second lanes without enabling any of the first lanes.

4. The system of claim 1, wherein the switch module is configured to enable an equal number of the first lanes and the second lanes.

5. The system of claim 1, wherein the each of the first computing device interface, the second computing device interface, and the third computing device interface is a peripheral component interconnect express (PCIe) interface.

6. The system of claim 5, wherein the first computing device interface is coupled to a first node and the second computing interface is coupled to a second node.

7. The system of claim 5, wherein the third computing device interface is coupled to one or more non-volatile memory express (NVMe) solid-state drives (SSD).

8. The system of claim 1, wherein the switch module includes one or more multiplexers.

9. The system of claim 1, wherein the number of the first lanes, the number of the second lanes, and the number of the third lanes are equal.

10. The system of claim 1, wherein the number of the first lanes, the number of the second lanes, and the number of the third lanes are different.

11. A method comprising:
receiving, at a switch module, one or more control signals, wherein the switch module comprises a first sub-switch configured to couple with a first computing device and a second sub-switch configured to couple with a second computer device, wherein the first sub-switch is configured to receive a first control signal of the one or more control signals and the second sub-switch is configured to receive a second control signal of the one or more control signals, the second control signal being distinct from the first control signal, wherein each of the first control signal and the second control signal enables or disables one or more predefined lanes;
selectively coupling at least one of one or more first lanes of a first computing device interface or one or more second lanes of a second computing device interface to third lanes of a third computing device interface to yield enabled lanes based on the control signals, wherein a number of the enabled lanes is less than or equal to a number of the third lanes;
routing the enabled lanes associated with the first computing device interface to a first portion of the third lanes in an increasing logical order and routing the enabled lanes associated with the second computing device interface to a second portion of the third lanes in a decreasing logical order.

12. The method of claim 11, wherein the switch module is configured to enable the first lanes without enabling any of the second lanes.

13. The method of claim 11, wherein the switch module is configured to enable the second lanes without enabling any of the first lanes.

14. The method of claim 11, wherein the switch module is configured to enable an equal number of the first lanes and the second lanes.

15. The method of claim 11, wherein the each of the first computing device interface, the second computing device interface, and the third computing device interface is a peripheral component interconnect express (PCIe) interface.

16. The method of claim 15, wherein the first computing device interface is coupled to a first node and the second computing interface is coupled to a second node, or the third computing device interface is coupled to one or more non-volatile memory express (NVMe) solid-state drives (SSD).

17. The method of claim 11, wherein the switch module includes one or more multiplexers.

18. The method of claim 11 wherein the number of the first lanes, the number of the second lanes, and the number of the third lanes are equal.

19. The method of claim 11, wherein the number of the first lanes, the number of the second lanes, and the number of the third lanes are different.

20. A system comprising:
a first node coupled to a switch module by a first peripheral component interconnect express (PCIe) bus, wherein the first PCIe bus has a first predefined number of lanes;
a second node coupled to the switch module by a second PCIe bus, wherein the second PCIe bus has a second predefined number of lanes; and
a non-volatile memory express (NVMe) solid-state drive (SSD) coupled to the switch module by a third PCIe bus, wherein the third PCIe bus has a third predefined number of lanes;
the switch module configured to receive one or more control signals, and in response to receiving the control signals causing the switch module to enable or disable one or more of the first predefined lanes and second predefined lanes, wherein the enabled lanes equal the third predefined number of lanes, wherein the switch module comprises a first sub-switch configured to couple with a first computing device and a second sub-switch configured to couple with a second computer device, wherein the first sub-switch is configured to receive a first control signal of the one or more control signals and the second sub-switch is configured to receive a second control signal of the one or more control signals, the second control signal being distinct from the first control signal, wherein each of the first control signal and the second control signal enables or disables one or more predefined lanes.

* * * * *